US008502796B1

(12) United States Patent
Yilmaz (10) Patent No.: US 8,502,796 B1
(45) Date of Patent: Aug. 6, 2013

(54) INTERPOLATED SINGLE-LAYER TOUCH SENSOR (75) Inventor: Esat Yilmaz, Santa Cruz, CA (US)

(73) Assignee: Atmel Corporation, San Jose, CA (US)

( * ) Notice: Subject to any disclaimer, the term of this patent is extended or adjusted under 35 U.S.C. 154(b) by 0 days.

(21) Appl. No.: 13/595,595

(22) Filed: Aug. 27, 2012

(51) Int. Cl.
G06F 3/041 (2006.01)

(52) U.S. Cl.
USPC .......................... 345/173; 178/18.06

(58) Field of Classification Search
USPC ................... 345/173, 174; 178/18.06
See application file for complete search history.

(56) References Cited

U.S. PATENT DOCUMENTS

| 7,663,607 | B2 | 2/2010 | Hotelling | |
|---|---|---|---|---|
| 7,875,814 | B2 | 1/2011 | Chen | |
| 7,920,129 | B2 | 4/2011 | Hotelling | |
| 8,031,094 | B2 | 10/2011 | Hotelling | |
| 8,031,174 | B2 | 10/2011 | Hamblin | |
| 8,040,326 | B2 | 10/2011 | Hotelling | |
| 8,049,732 | B2 | 11/2011 | Hotelling | |
| 8,179,381 | B2 | 5/2012 | Frey | |
| 2009/0315854 | A1 | 12/2009 | Matsuo | |
| 2010/0059294 | A1* | 3/2010 | Elias et al. | 178/18.06 |
| 2011/0025639 | A1* | 2/2011 | Trend et al. | 345/174 |
| 2012/0227259 | A1* | 9/2012 | Badaye et al. | 29/846 |
| 2012/0242588 | A1 | 9/2012 | Myers | |
| 2012/0242592 | A1 | 9/2012 | Rothkopf | |
| 2012/0243151 | A1 | 9/2012 | Lynch | |
| 2012/0243719 | A1 | 9/2012 | Franklin | |

FOREIGN PATENT DOCUMENTS

WO    WO 2012/129247    9/2012

OTHER PUBLICATIONS

U.S. Appl. No. 61/454,936, filed Mar. 21, 2011, Myers.
U.S. Appl. No. 61/454,950, filed Mar. 21, 2011, Lynch.
U.S. Appl. No. 61/454,894, filed Mar. 21, 2011, Rothkopf.

* cited by examiner

Primary Examiner — Jimmy H Nguyen
(74) Attorney, Agent, or Firm — Baker Botts LLP (57) ABSTRACT A touch sensor includes a first, second, and third electrode line on one side of a substrate. The first and second electrode lines extend along a first direction, and the third electrode line extends at an angle to the first direction. The first electrode line includes a set of first electrodes that decrease in length along the first direction. The second electrode line includes a set of second electrodes that increase in length along the first direction. The third electrode line includes third and fourth electrodes. A set of the third electrodes decrease in length along the first direction and are interdigitated with the first electrodes. A set of the fourth electrodes increase in length along the first direction and are interdigitated with the second electrodes. The first, second, third, and fourth electrodes are substantially perpendicular to the first direction.

20 Claims, 6 Drawing Sheets

INTERPOLATED SINGLE-LAYER TOUCH SENSOR

TECHNICAL FIELD

This disclosure generally relates to touch sensors.

BACKGROUND

An array of conductive drive and sense electrodes may form a mutual-capacitance touch sensor having one or more capacitive nodes. The mutual-capacitance touch sensor may have either a two-layer configuration or single-layer configuration. In a single-layer configuration, drive and sense electrodes may be disposed in a pattern on one side of a substrate. In such a configuration, a pair of drive and sense electrodes capacitively coupled to each other across a space or dielectric between electrodes may form a capacitive node.

In a single-layer configuration for a self-capacitance implementation, an array of vertical and horizontal conductive electrodes may be disposed in a pattern on one side of the substrate. Each of the conductive electrodes in the array may form a capacitive node, and, when an object touches or comes within proximity of the electrode, a change in self-capacitance may occur at that capacitive node and a controller may measure the change in capacitance as a change in voltage or a change in the amount of charge needed to raise the voltage to some pre-determined amount.

A touch sensor detects the presence and location of a touch or the proximity of an object (such as a user's finger or a stylus) within a touch-sensitive area of the touch sensor overlaid, for example, on a display screen. In a touch-sensitive-display application, the touch sensor enables a user to interact directly with what is displayed on the screen, rather than indirectly with a mouse or touchpad. A touch sensor may be attached to or provided as part of a desktop computer, laptop computer, tablet computer, personal digital assistant (PDA), smartphone, satellite navigation device, portable media player, portable game console, kiosk computer, point-of-sale device, or other suitable device. A control panel on a household or other appliance may include a touch sensor.

There are different types of touch sensors, such as (for example) resistive touch screens, surface acoustic wave touch screens, capacitive touch screens, infrared touch screens, and optical touch screens. Herein, reference to a touch sensor encompasses a touch screen, and vice versa, where appropriate. A capacitive touch screen may include an insulator coated with a substantially transparent conductor in a particular pattern. When an object touches or comes within proximity of the surface of the capacitive touch screen, a change in capacitance occurs within the touch screen at the location of the touch or proximity. A controller processes the change in capacitance to determine the touch position(s) on the touch screen.

DESCRIPTION OF EXAMPLE EMBODIMENTS

Figure 1:
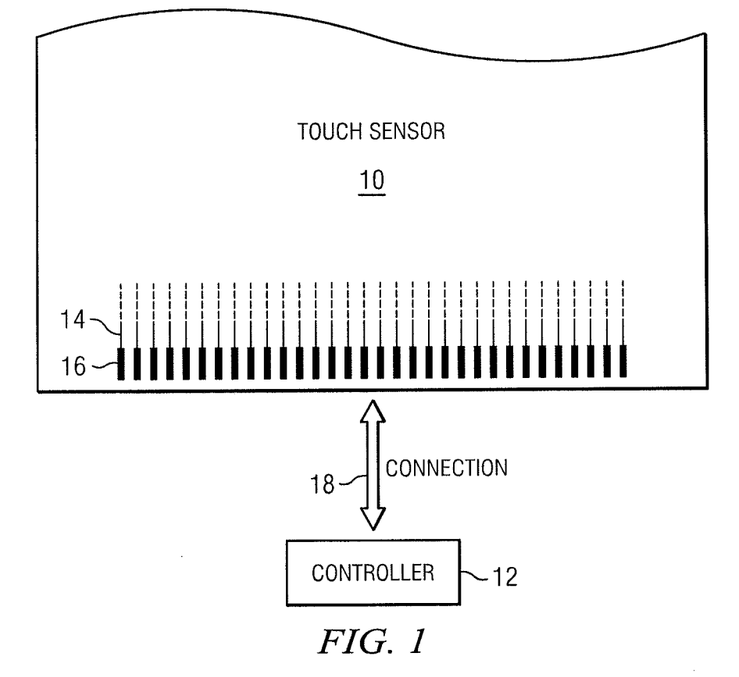
FIG. 1 illustrates a touch sensor with an example controller, according to example embodiments.

FIG. 1 illustrates an example touch sensor 10 with an example controller 12. Herein, reference to a touch sensor may encompass a touch screen, and vice versa, where appropriate. Touch sensor 10 and controller 12 detect the presence and location of a touch or the proximity of an object within a touch-sensitive area of touch sensor 10. Herein, reference to a touch sensor encompasses both the touch sensor and its controller, where appropriate. Similarly, reference to a controller encompasses both the controller and its touch sensor, where appropriate. Touch sensor 10 includes one or more touch-sensitive areas, where appropriate. Touch sensor 10 includes an array of drive and sense electrodes disposed on a substrate, which in some embodiments is a dielectric material.

In certain embodiments, one or more portions of the substrate of touch sensor 10 are made of polyethylene terephthalate (PET) or another suitable material. This disclosure contemplates any suitable substrate with any suitable portions made of any suitable material. In particular embodiments, the drive or sense electrodes in touch sensor 10 are made of indium tin oxide (ITO) in whole or in part. In particular embodiments, the drive or sense electrodes in touch sensor 10 are made of fine lines of metal or other conductive material. As an example and not by way of limitation, one or more portions of the conductive material are copper or copper-based and have a thickness of approximately 5 µm or less and a width of approximately 10 µm or less. As another example, one or more portions of the conductive material are silver or silver-based and similarly have a thickness of approximately 5 µm or less and a width of approximately 10 µm or less. This disclosure contemplates any suitable electrodes made of any suitable material.

In certain embodiments, touch sensor 10 implements a capacitive form of touch sensing. In a mutual-capacitance implementation, touch sensor 10 includes an array of drive and sense electrodes forming an array of capacitive nodes. In certain embodiments, a drive electrode and a sense electrode form a capacitive node. The drive and sense electrodes forming the capacitive node come near each other, but do not make electrical contact with each other. Instead, the drive and sense electrodes are capacitively coupled to each other across a gap between them. A pulsed or alternating voltage applied to the drive electrode (i.e., by controller 12) induces a charge on the sense electrode, and the amount of charge induced is susceptible to external influence (such as a touch or the proximity of an object). When an object touches or comes within proximity of the capacitive node, a change in capacitance occurs at the capacitive node and controller 12 measures the change in capacitance. By measuring changes in capacitance throughout the array, controller 12 determines the position of the touch or proximity within the touch-sensitive area(s) of touch sensor 10.

In particular embodiments, one or more drive electrodes together form a drive line running horizontally or vertically or in any suitable orientation. Similarly, one or more sense electrodes together form a sense line running horizontally or vertically or in any suitable orientation. In particular embodiments, drive lines run substantially perpendicular to sense lines. Herein, reference to a drive line encompasses one or more drive electrodes making up the drive line, and vice versa, where appropriate. Similarly, reference to a sense line encompasses one or more sense electrodes making up the sense line, and vice versa, where appropriate.

In certain embodiments, touch sensor 10 has a single-layer configuration, with drive and sense electrodes disposed in a pattern on one side of a substrate. In such a configuration, a pair of drive and sense electrodes capacitively coupled to each other across a space between them forms a capacitive node. In a single-layer configuration for a self-capacitance implementation, electrodes of only a single type (e.g. drive) are disposed in a pattern on one side of the substrate. Although this disclosure describes particular configurations of particular electrodes forming particular nodes, this disclosure contemplates any suitable configuration of any suitable electrodes forming any suitable nodes. Moreover, this disclosure contemplates any suitable electrodes disposed on any suitable number of any suitable substrates in any suitable patterns.

As described above, a change in capacitance at a capacitive node of touch sensor 10 may indicate a touch or proximity input at the position of the capacitive node. Controller 12 is operable to detect and process the change in capacitance to determine the presence and location of the touch or proximity input. Certain embodiments if controller 12 communicate information about the touch or proximity input to one or more other components (such one or more central processing units (CPUs) or digital signal processors (DSPs)) of a device that includes touch sensor 10 and controller 12, which may respond to the touch or proximity input by initiating a function of the device (or an application running on the device) associated with it. Although this disclosure describes a particular controller having particular functionality with respect to a particular device and a particular touch sensor, this disclosure contemplates any suitable controller having any suitable functionality with respect to any suitable device and any suitable touch sensor.

In certain embodiments, controller 12 is one or more integrated circuits (ICs)—such as for example general-purpose microprocessors, microcontrollers, programmable logic devices or arrays, and application-specific ICs (ASICs). In some embodiments, controller 12 is coupled to a flexible printed circuit (FPC) bonded to the substrate of touch sensor 10, as described below. Certain embodiments of controller 12 include a processor unit, a drive unit, a sense unit, and a storage unit. The drive unit supplies drive signals to the drive electrodes of touch sensor 10. The sense unit senses charge at the capacitive nodes of touch sensor 10 and provides measurement signals to the processor unit representing capacitances at the capacitive nodes. The processor unit controls the supply of drive signals to the drive electrodes by the drive unit and process measurement signals from the sense unit to detect and process the presence and location of a touch or proximity input within the touch-sensitive area(s) of touch sensor 10. The processor unit also tracks changes in the position of a touch or proximity input within the touch-sensitive area(s) of touch sensor 10. The storage unit, which includes one or more memory devices, stores programming for execution by the processor unit, including programming for controlling the drive unit to supply drive signals to the drive electrodes, programming for processing measurement signals from the sense unit, and other suitable programming, where appropriate. Although this disclosure describes a particular controller having a particular implementation with particular components, this disclosure contemplates any suitable controller having any suitable implementation with any suitable components.

Tracks 14 of conductive material disposed on the substrate of touch sensor 10 couple the drive or sense electrodes of touch sensor 10 to connection pads 16, also disposed on the substrate of touch sensor 10. As described below, connection pads 16 facilitate coupling of tracks 14 to controller 12. In certain embodiments, tracks 14 extend into or around (e.g. at the edges of) the touch-sensitive area(s) of touch sensor 10. Particular tracks 14 provide drive connections for coupling controller 12 to drive electrodes of touch sensor 10, through which the drive unit of controller 12 supplies drive signals to the drive electrodes. Other tracks 14 provide sense connections for coupling controller 12 to sense electrodes of touch sensor 10, through which the sense unit of controller 12 senses charge at the capacitive nodes of touch sensor 10. In certain embodiments, tracks 14 are made of fine lines of metal or other conductive material. As an example and not by way of limitation, the conductive material of tracks 14 are copper or copper-based and have a width of approximately 100 μm or less. As another example, the conductive material of tracks 14 are silver or silver-based and have a width of approximately 100 μm or less. In particular embodiments, tracks 14 are made of ITO in whole or in part in addition or as an alternative to fine lines of metal or other conductive material. Although this disclosure describes particular tracks made of particular materials with particular widths, this disclosure contemplates any suitable tracks made of any suitable materials with any suitable widths. In addition to tracks 14, certain embodiments of touch sensor 10 include one or more ground lines terminating at a ground connector (similar to a connection pad 16) at an edge of the substrate of touch sensor 10 (similar to tracks 14).

In certain embodiments, connection pads 16 are located along one or more edges of the substrate, outside the touch-sensitive area(s) of touch sensor 10. As described above, controller 12 is on an FPC in certain embodiments. In some embodiments, connection pads 16 are made of the same material as tracks 14 and are bonded to the FPC using an anisotropic conductive film (ACF). In certain embodiments, connection 18 includes conductive lines on the FPC coupling controller 12 to connection pads 16, in turn coupling controller 12 to tracks 14 and to the drive or sense electrodes of touch sensor 10. In another embodiment, connection pads 160 are inserted into an electro-mechanical connector (such as a zero insertion force wire-to-board connector); in this embodiment, connection 180 does not need to include an FPC. This disclosure contemplates any suitable connection 18 between controller 12 and touch sensor 10.

Figure 2A:
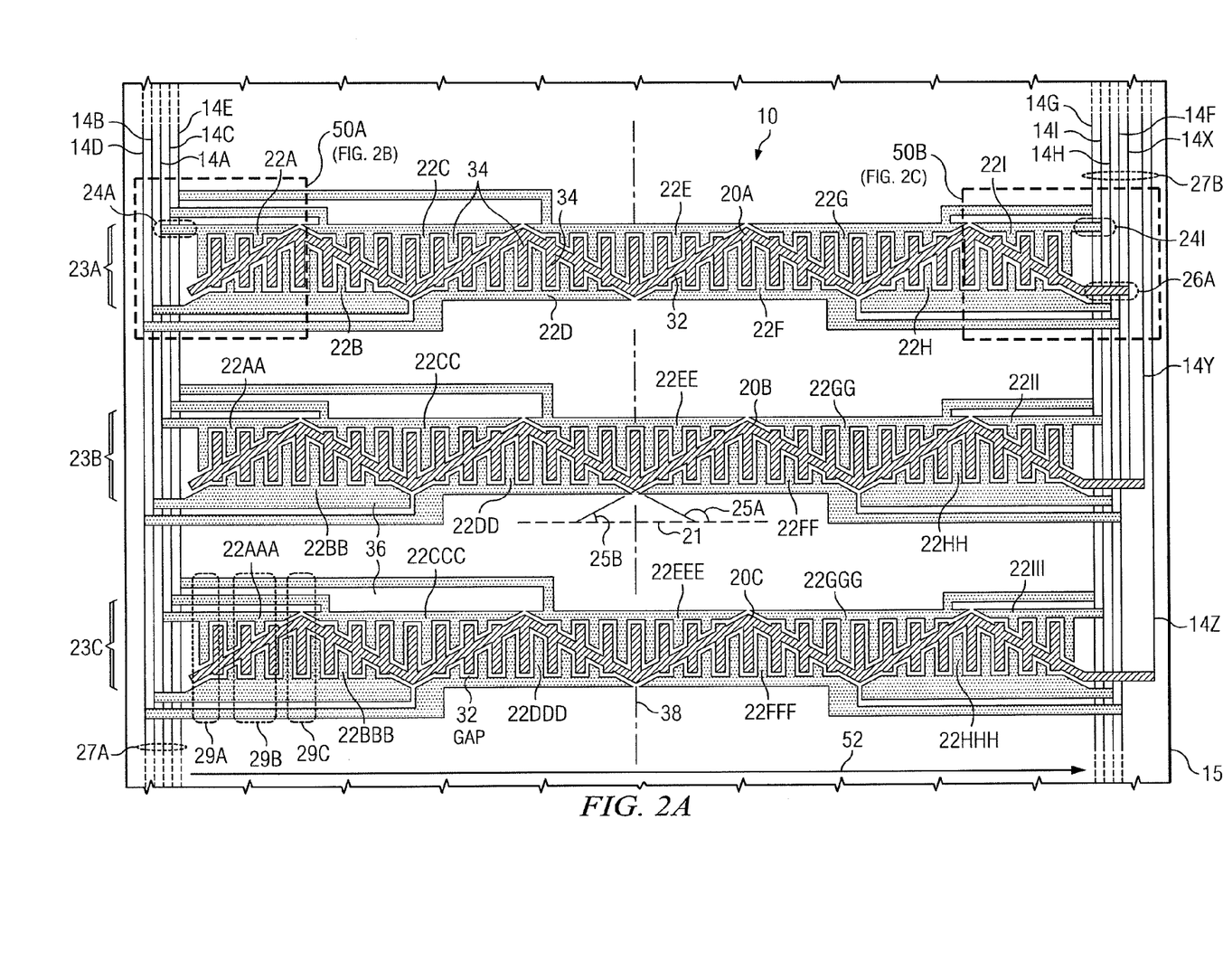
FIGS. 2A-2C illustrate patterns for the touch sensor of FIG. 1, according to example embodiments.

FIG. 2A illustrates an example single-layer touch sensor for use in the example system of FIG. 1. In the example of FIG. 2A, touch sensor 10 includes an array of one or more drive electrodes 20A-C and one or more sense electrodes 22A-III defining a touch-sensitive area of touch sensor 10. Each row 23 of the array includes a drive electrode 20A-C extending at alternating angles 25 to an axis 21 corresponding to rows 23 of the array. Each row 23 also includes one or more sense electrodes 22A-III disposed adjacent to a corresponding drive electrode 20A-C. As an example and not by way of limitation, row 23A of the array includes drive electrode 20A with corresponding sense electrodes 22A-I disposed adjacent to drive electrode 20A. One or more sense electrodes 22A-III commonly coupled to a track 14, e.g., tracks 14A-I, define columns 27A-B that are substantially perpendicular to rows 23 of the array. As an example and not by way of limitation, sense electrodes 22F, 22FF and 22FFF commonly coupled to track 14F define part of column 27b of the array. As discussed above, in certain embodiments each drive electrode 20A-C is capacitively coupled to one or more adjacent sense electrodes 22A-III separated by a gap 32.

An electrode (whether a drive electrode 20A-C or a sense electrode 22A-III) is an area of conductive material forming a shape, such as for example a disc, square, rectangle, other suitable shape, or suitable combination of these. In particular embodiments, the conductive material of an electrode, e.g., 22A and 20C, occupies approximately 100% of the area of its shape. As an example and not by way of limitation, drive and sense electrodes e.g., 22A and 20C, along with electrode connectors, e.g., 24I, are made of indium tin oxide (ITO) and the ITO of the drive and sense electrodes, e.g., 22A and 20C, occupies approximately 100% of the area of its shape, where appropriate. In particular embodiments, the conductive material of an electrode, e.g., 22A and 20C, occupies approximately 50% of the area of its shape. As an example and not by way of limitation, an electrode, e.g., 22A and 20C, is made of ITO and the ITO of the drive and sense electrodes, e.g., 22A and 20C, occupies approximately 50% of the area of its shape in a hatched or other suitable pattern. In particular embodiments, the conductive material of an electrode, e.g., 22A and 20C, occupies approximately 5% of the area of its shape. As an example and not by way of limitation, an electrode, e.g., 22A and 20C, is made of fine lines of metal (such as for example copper, silver, or a copper- or silver-based material) or other conductive material and the fine lines of conductive material occupy approximately 5% of the area of its shape in a hatched or other suitable pattern. Although this disclosure describes or illustrates particular electrodes made of particular conductive material forming particular shapes with particular fills having particular patterns, this disclosure contemplates any suitable electrodes made of any suitable conductive material forming any suitable shapes with any suitable fills having any suitable patterns. Where appropriate, the shapes of the electrodes (or other elements) of a touch sensor constitute in whole or in part one or more macro-features of certain embodiments of the touch sensor. One or more characteristics of the implementation of those shapes (such as, for example, the conductive materials, fills, or patterns within the shapes or the means of electrically isolating or physically separating the shapes from each other) constitute in whole or in part one or more micro-features of certain embodiments of the touch sensor.

Figure 2B:
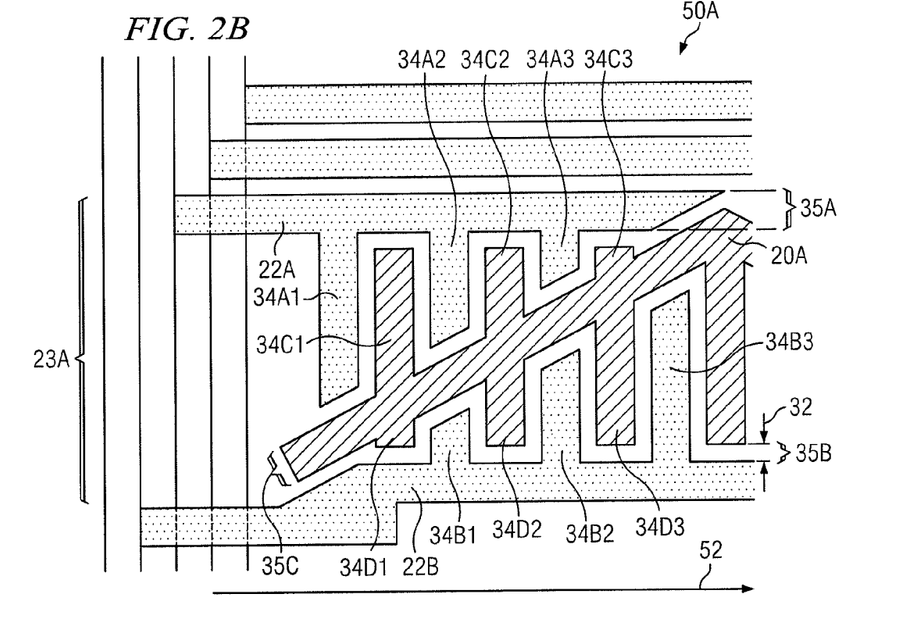
Figure 2C:
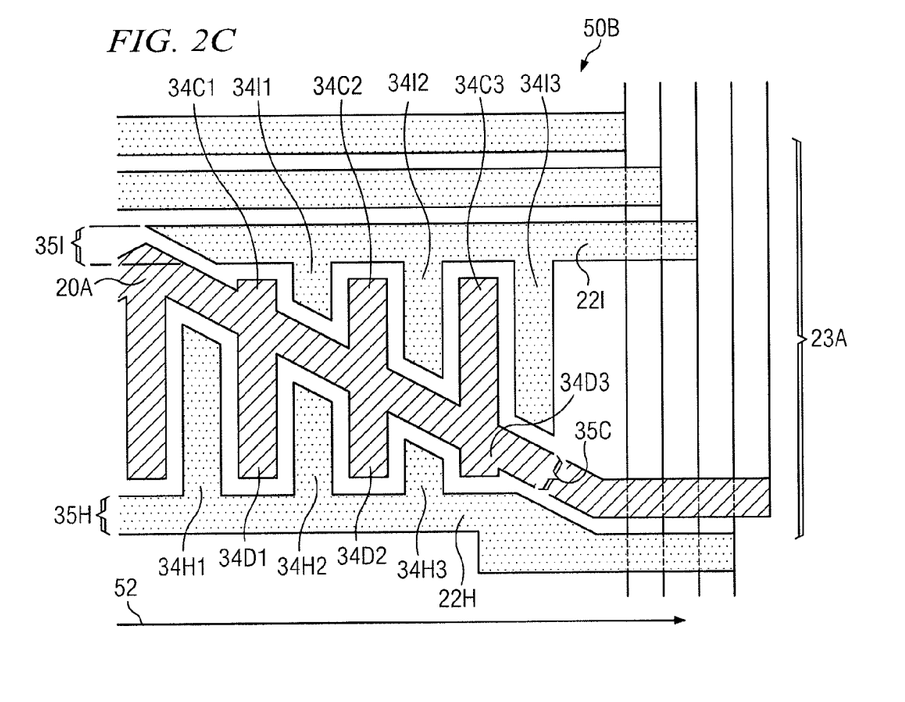

In particular embodiments, drive electrodes 20A-C and sense electrodes 22A-III include individual electrodes 34 or "teeth" that protrude from main electrode lines (e.g., electrode lines 35 as illustrated in FIGS. 2B and 2C). Certain embodiments of electrodes 34 of each sense electrode 22A-III are adjacent to an electrode 34 of a corresponding drive electrode 20A-C forming capacitive coupling edges separated by gap 32. Electrodes 34 may be interleaved or interdigitated to increase the number of capacitive coupling edges between one or more sense electrodes and a corresponding drive electrode. As an example and not by way of limitation, electrodes 34 of sense electrodes 22CCC and 22GGG are interdigitated with electrodes 34 of corresponding drive electrode 20C. Capacitive coupling between sense electrode and corresponding drive electrode is determined by dimensions of gap 32 and edges of electrodes 34. In some embodiments, gap 32 is substantially uniform (e.g., gap 32 between drive electrodes 20A-C and sense electrodes 22A-III and their corresponding electrodes 34 is substantially the same width). In other embodiments, gap 32 may not be uniform. In addition, certain embodiments include drive electrodes 20A-C, sense electrodes 22A-III, and electrodes 34 that have substantially similar widths (e.g., the widths of electrodes 34 and electrode lines 35 of drive electrodes 20A-C and sense electrodes 22A-III are substantially the same). In other embodiments, drive electrodes 20A-C, sense electrodes 22A-III, and electrodes 34 do not have substantially similar widths (e.g., the widths of electrodes 34 and electrode lines 35 of drive electrodes 20A-C and sense electrodes 22A-III are not substantially the same). Although this disclosure describes and illustrates a particular arrangement of electrodes for touch sensor 10, this disclosure contemplates any suitable arrangement of electrodes for touch sensor 10.

In the illustrated embodiment of FIG. 2A, the width of the discrete pieces of material forming the various portions of drive electrodes 20A-C, sense electrodes 22A-III, electrodes 34, electrode lines 35, etc., and the spacing between those pieces and other portions of touch sensor 10, is not uniform. In certain embodiments, the width of those pieces and the spacing between them and other portions of touch sensor 10 is substantially uniform. In embodiments where the width of those pieces and the spacing between them is substantially uniform, visual artifacts are reduced and images viewed through the sensor are affected less than with non-uniform sensors. In such uniform sensor embodiments, the uniformity can be achieved by appropriate design of the various portions of the electrodes of touch sensor 10 and/or by adjusting the spacing between them. As just one example, disconnected pieces of the same material used to form the electrodes of touch sensor 10 may be positioned in any open spaces of touch sensor 10. For example, disconnected material may be placed in the open space between track 14E and sense electrode 22A, in the open space between track 14G and sense electrode 22I, in the rectangular open spaces above sense electrodes 22C, 22E, and 22G, in the rectangular open spaces below sense electrodes 22D and 22F, and the like. Likewise, open spaces illustrated in FIGS. 2B-2C, 3A-3B, and 4 may also be filled with such disconnected material. Such disconnected pieces of material used to fill the open spaces of touch sensor 10 are not electrically connected to any tracks 14 and do not function as electrodes.

To further illustrate electrodes 34, FIG. 2B is an enlarged area 50a of a portion of row 23A of FIG. 2A. FIG. 2B illustrates electrode line 35A and electrodes 34A (e.g., 34A1-34A3) of sense electrode 22A, electrode line 35B and electrodes 34B (e.g., 34B1-34B3) of sense electrode 22B, and electrode line 35C and electrodes 34C (e.g., 34C1-34C3) and 34D (e.g., 34D1-34D3) of drive electrode 20A. In certain embodiments, electrode lines 35A-C and electrodes 34A-D are all disposed on the same side of substrate 15.

As illustrated in FIG. 2B, electrode lines 35A and 35B are substantially parallel to direction 52, which is parallel to axis 21 and extends between the left and right ends of substrate 15. Electrode line 35A includes electrodes 34A that protrude from electrode line 35A and are substantially perpendicular to electrode line 35A and direction 52. In certain embodiments, a set of electrodes 34A decreases in length along direction 52. For example, electrode 34A1, which is closest to the left edge of electrode line 35A, is longer than electrode 34A2. Electrode 34A2, in turn, is longer than electrode 34A3, and so forth. Similarly, electrode line 35B includes electrodes 34B that protrude from electrode line 35B and are substantially perpendicular to electrode line 35B and direction 52. In certain embodiments, a set of electrodes 34B increases in length along direction 52. For example, electrode 34B1, which is closest to the left edge of electrode line 35B, is shorter than electrode 34B2. Electrode 34B2, in turn, is shorter than electrode 34B3, and so forth.

Electrode line 35C includes electrodes 34C that protrude from the top of electrode line 35C and electrodes 34D that protrude from the bottom of electrode line 35C. Electrodes 34C and 34D are substantially perpendicular to electrode line 35C and direction 52. Electrodes 34C are interdigitated with electrodes 34A (i.e., there are alternating electrodes 34C and 34A along direction 52) and electrodes 34D are interdigitated with electrodes 34B (i.e., there are alternating electrodes 34D and 34B along direction 52). In certain embodiments, a set of electrodes 34C decreases in length along direction 52. For example, electrode 34C1, which is closest to the left edge of electrode line 35C, is longer than electrode 34C2. Electrode 34C2, in turn, is longer than electrode 34C3, and so forth. In certain embodiments, a set of electrodes 34D increases in length along direction 52. For example, electrode 34D1, which is closest to the left edge of electrode line 35C, is shorter than electrode 34D2. Electrode 34D2, in turn, is shorter than electrode 34D3, and so forth.

FIG. 2C is an enlarged area 50b of another portion of row 23A of FIG. 2A. FIG. 2C illustrates electrode line 35I and electrodes 34I (e.g., 34I1-34I3) of sense electrode 22I, electrode line 35H and electrodes 34H (e.g., 34H1-34H3) of sense electrode 22H, and electrode line 35C and electrodes 34C (e.g., 34C1-34C3) and 34D (e.g., 34D1-34D3) of drive electrode 20A. In certain embodiments, electrode lines 35 and electrodes 34 illustrated in FIG. 2C are all disposed on the same side of substrate 15.

As illustrated in FIG. 2C, electrode lines 35I and 35H are substantially parallel to direction 52, which is parallel to axis 21 and extends between the left and right ends of substrate 15. Electrode line 35I includes electrodes 34I that protrude from electrode line 35I and are substantially perpendicular to electrode line 35I and direction 52. In certain embodiments, a set of electrodes 34I increases in length along direction 52. For example, electrode 34I3, which is closest to the right edge of electrode line 35I, is longer than electrode 34I2. Electrode 34I2, in turn, is longer than electrode 34I3, and so forth. Similarly, electrode line 35H includes electrodes 34H that protrude from electrode line 35H and are substantially perpendicular to electrode line 35H and direction 52. In certain embodiments, a set of electrodes 34H decreases in length along direction 52. For example, electrode 34H3, which is closest to the right edge of electrode line 35H, is shorter than electrode 34H2. Electrode 34H2, in turn, is shorter than electrode 34H3, and so forth.

Electrodes 34C are interdigitated with electrodes 34I (i.e., there are alternating electrodes 34C and 34I along direction 52) and electrodes 34D are interdigitated with electrodes 34H (i.e., there are alternating electrodes 34D and 34H along direction 52). In certain embodiments, a set of electrodes 34C increases in length along direction 52. For example, electrode 34C3, which is closest to the right edge of electrode line 35C, is longer than electrode 34C2. Electrode 34C2, in turn, is longer than electrode 34C3, and so forth. In certain embodiments, a set of electrodes 34D decreases in length along direction 52. For example, electrode 34D1, which is closest to the right edge of electrode line 35C, is shorter than electrode 34D2. Electrode 34D2, in turn, is shorter than electrode 34D3, and so forth.

Returning to FIG. 2A, optical properties of gap 32 as well as voids 36 within other areas of the array with large dimensions relative to feature sizes of drive electrodes 20A-C may have different optical properties than the optical properties of electrodes (either sense electrodes 22A-III or drive electrodes 20A-C). Optical discontinuities may occur when viewing a display underneath touch sensor 10 due to these differences in optical properties. In certain embodiments, gaps 32 and voids 36 within other areas of the array are substantially filled using the conductive material used to fabricate drive electrodes 20A-C and sense electrodes 22A-III in such a way to electrically isolate the filled in areas from nearby drive electrodes 20A-C and sense electrodes 22A-III or electrode connectors, i.e., 24A, 24I, and 26A. In particular embodiments, gaps 32 and voids 36 are substantially filled using "in-fill" shapes of electrode conductive material isolated from neighboring in-fill shapes by non-conducting gaps. The isolated in-fill shapes may serve to visually obscure a pattern of drive electrodes 20A-C and sense electrodes 22A-III, while having a minimal impact on the fringing fields between adjacent electrodes. Therefore, using in-fill shapes may have electric field distributions substantially similar to electric field distributions without in-fill shapes. In certain embodiments, the in-filling is formed during manufacture and using the same process steps as drive electrodes 20A-C and sense electrodes 22A-III, such that in-fill shapes are formed from the same material and have substantially the same thickness and electrical properties as drive electrodes 20A-C and sense electrodes 22A-III.

Filling in gap 32 or void 36 using in-fill shapes reduces a number of areas with optical discontinuities visible when viewing the display. In particular embodiments, in-fill shapes are formed using metal, conductive plastic, ITO, or other form of conductive material, such as fine line metal. In certain embodiments, the material used to fill in a gap 32 or void 36 depends on the conductive material used to fabricate drive electrodes 20A-C and sense electrodes 22A-III. As an example and not by way of limitation, certain embodiments of gaps 32 and voids 36 are substantially filled in using a series of electrically isolated squares formed during fabrication of drive electrodes 20A-C and sense electrodes 22A-III. Although this disclosure describes or illustrates particular in-fill shapes having particular patterns, this disclosure contemplates any suitable in-fill shapes having any suitable patterns.

Drive electrodes 20A-C and sense electrodes 22A-III are coupled to tracks, e.g., tracks 14A-I and 14X-Z, through electrode connectors, i.e., electrode connectors 24A and 24I. In particular embodiments, drive electrodes 20A-C, sense electrodes 22A-III, and electrode connectors, i.e., 24A and 24I, are formed using a single conductive layer (e.g., are all on one side of substrate 15). In other particular embodiments, connections from sense electrodes 22A-III to corresponding tracks 14A-I are determined based on a position relative to a center axis 38, provided as an illustration and not by way of limitation. As an example and not by way of limitation, sense electrode 22D is left of center axis 38 in one embodiment. On this basis, sense electrode 22D is coupled to track 14D on a left side of the array. Similarly, sense electrode 22F is located right of axis 38 in some embodiments and is coupled to track 14F on a right side of the array. As described above, columns of sense electrodes, such as 22A, 22AA, and 22AAA, are commonly coupled to track 14A in some embodiments. In particular embodiments, drive electrodes 20A-C are continuous across the length of the rows of the array. As an example and not by way of limitation, drive electrode 20C is coupled to a track 14Z on either side of the array. In other particular embodiments, tracks 14A-I and 14X-Z are located on a different vertical level than electrode connectors, i.e., 24A and 26A. As described above, controller 12 transmits drive signals to drive electrodes 20A-C and receives sensing signals from sense electrodes 22A-III through tracks 14A-I and 14X-Z to determine the position of an object adjacent touch sensor 10.

Angles 25 (e.g., angles 25A and 25B) may be any appropriate angles with respect to axis 21. In some embodiments, angles 25 are determined according to a node pitch of the array of sense electrodes 22A-III. For example, in the illustrated embodiment of FIG. 2A, there are nine sense electrodes on each row 23 (i.e., sense electrodes 22A-I on row 23a). In certain embodiments, the node pitch of this embodiment would be the width of the array divided by nine. Angles 25 would therefore be directly proportional to 1/9th of the width of the array. Consider, however, other embodiments that have fewer than nine electrodes (i.e., seven). The node pitch of such an embodiment would then be the width of the array divided by seven, and angles 25 would therefore be directly proportional to 1/7th of the width of the array.

The single-layer touch sensor illustrated in FIG. 2A may be referred as an "interpolated" touch sensor. As used herein, "interpolated" refers to a varying proportion of edges between drive electrodes 20A-C and sense electrodes 22A-III along axis 21. For example, areas 29A-C illustrate the varying proportion of edges between drive electrode 20C and sense electrodes 22AAA and 22BBB along axis 21. Moving from left to right of row 23C along axis 21 (e.g., along direction 52), the proportion of edges between drive electrode 20C and sense electrodes 22AAA and between drive electrode 20C and sense electrodes 22BBB changes from mostly sense electrode 22AAA edges, to a mix of sense electrode 22AAA and 22BBB edges, and finally to mostly sense electrode 22BBB edges. More specifically, area 29A illustrates an area in which the majority of edges between drive and sense electrodes is from sense electrode 22AAA, area 29B illustrates an area in which there is a substantially equal mix of edges between drive and sense electrodes (e.g., a similar amount of edges between drive electrode 20C and sense electrode 22AAA and between electrode 20C and sense electrode 22BBB), and area 29C illustrates an area in which the majority of edges between drive and sense electrodes is from sense electrode 22BBB. Consequently, the single-layer touch sensor illustrated in FIG. 2A provides better linearity over typical touch sensors. That is, single-layer touch sensor illustrated in FIG. 2A is able to detect straighter lines as a user draws a finger or stylus across the array along axis 21.

Figure 3A:
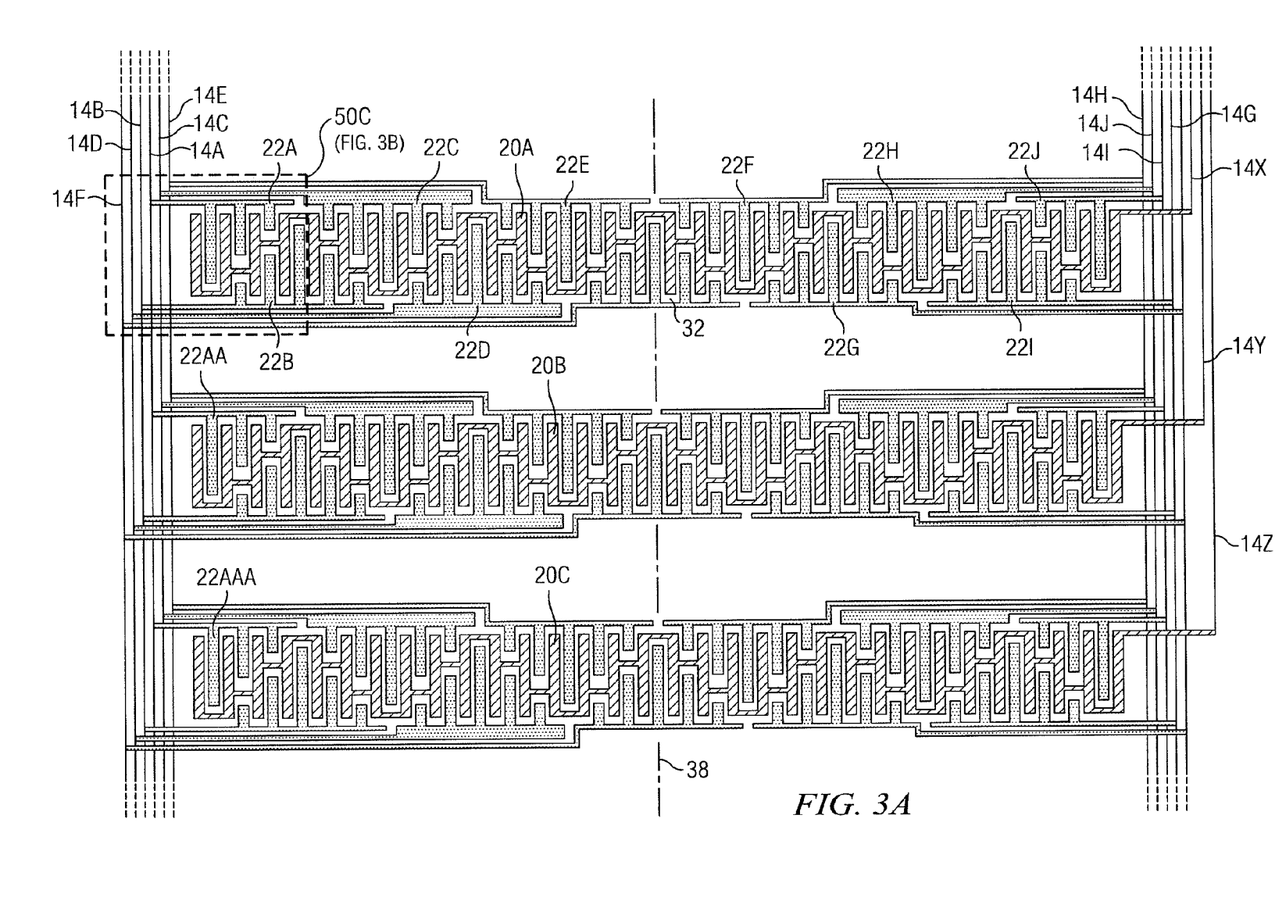
FIGS. 3A and 3B illustrate another pattern for the touch sensor of FIG. 1, according to example embodiments.
Figure 3B:
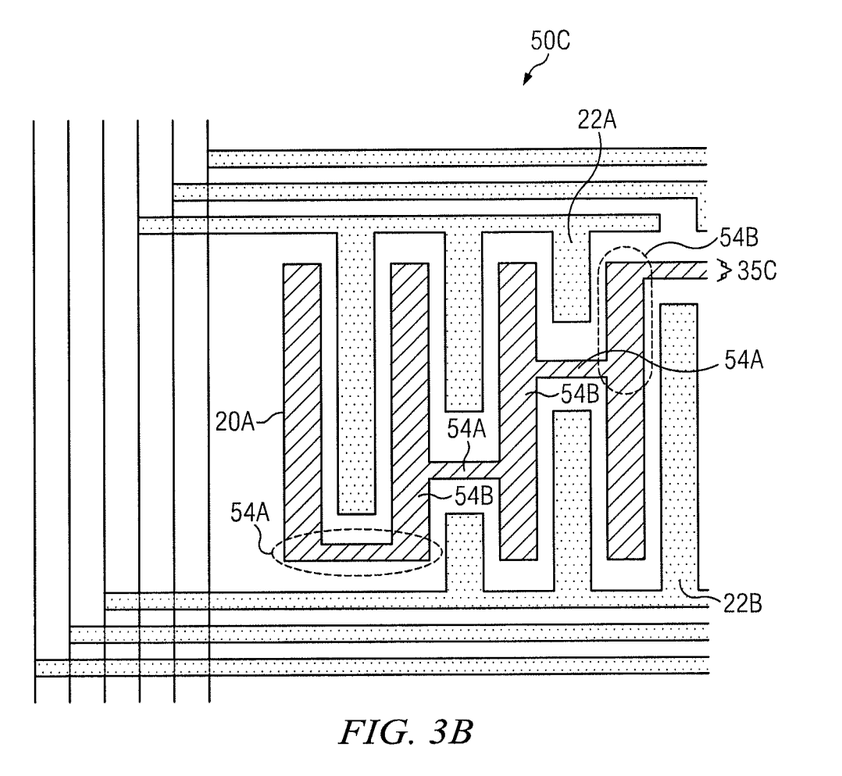

FIGS. 3A and 3B illustrate another example single-layer touch sensor for use in the example system of FIG. 1 (FIG. 3B is an enlarged area 50C of FIG. 3A). Similar to the example of FIG. 2A, the embodiment of touch sensor 10 in FIGS. 3A and 3B includes an array of one or more drive electrodes 20A-C and one or more sense electrodes 22A-JJJ defining a touch-sensitive area of touch sensor 10. Each row 23 of the array includes a drive electrode 20A-C. Instead of drive electrodes 20A-C having electrode lines 35 that extend at alternating angles 25 to an axis 21, however, drive electrodes 20A-C in the single-layer touch sensor of FIGS. 3A and 3B have electrode lines 35 that stair-step at alternating angles 25 to an axis 21 (i.e., drive electrode 20A includes electrode line 35C that stair-steps at an angle to axis 21). More specifically, each electrode line 35 of drive electrodes 20A-C includes alternating horizontal and vertical segments 54 (e.g., parallel segments 54A that are parallel to axis 21 and perpendicular segments 54B that are perpendicular to axis 21). Each row 23 also includes one or more sense electrodes 22A-JJJ disposed adjacent to corresponding drive electrode 20A-C, as described above in reference to FIGS. 2A-2C. While FIGS. 3A and 3B illustrate gap 32 as not being uniform, other embodiments may include a substantially uniform gap 32 (e.g., gap 32 between drive electrodes 20A-C and sense electrodes 22A-JJJ is substantially the same width). In addition, while FIGS. 3A and 3B illustrate portions of drive electrodes 20A-C and sense electrodes 22A-JJJ having different widths (i.e., parallel segments 54A have different widths from perpendicular segments 54B), other embodiments include electrodes 20A-C and sense electrodes 22A-JJJ that have substantially similar widths (e.g., the widths of the various portions of electrodes 20A-C and sense electrodes 22A-JJJ are substantially the same).

Figure 4:
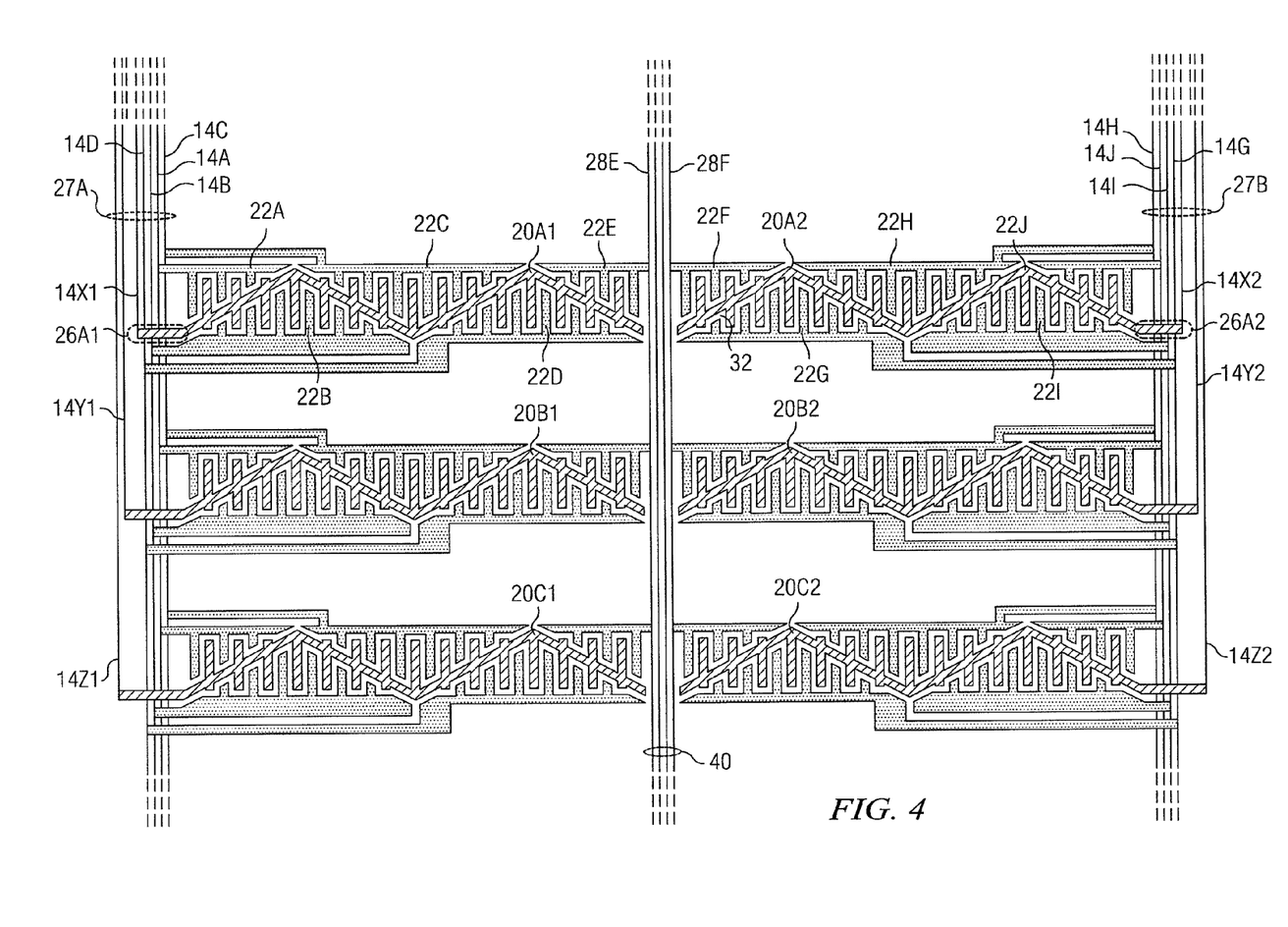
FIG. 4 illustrates a touch sensor of FIGS. 2A-2C having a central spine, according to example embodiments.

FIG. 4 illustrates an example single-layer touch sensor with a central spine 40 for use in the example system of FIG. 1. In the example of FIG. 4, central spine 40, including electrode connectors 28E-F, extends continuously across the touch sensitive area of touch sensor 10 and notionally divides the touch-sensitive area of touch sensor 10 into halves. Corresponding sense electrodes 22E, 22EE, and 22EEE and 22F, 22FF, and 22FFF on either side of central spine 40 are commonly coupled to electrode connectors 28E and 28F, respectively. As an example and not by way of limitation, columns of sense electrodes 22A-AAA, 22B-BBB, 22C-CCC, and 22D-DDD, which are left of central spine 40, are commonly coupled to tracks 14A-I4D, respectively, located on a left side of the array. Similarly, columns of sense electrodes 22G-GGG, 22H-HHH, 22I-III, and 22J-JJJ, which are right of central spine 40, are commonly coupled to tracks 14G-14J, respectively, located on a right side of the array. As described above, one or more sense electrodes, e.g., 22A-AAA, commonly coupled to a track, e.g., 14A, define columns 27 that are substantially perpendicular to rows 23 of the array.

In particular embodiments, drive electrodes 20A1 and 20A2, 20B1 and 20B2, and 20C1 and 20C2 are continuous from a side of the array to central spine 40. As with sense electrodes 22A-JJJ, drive electrodes 20A1, 20A2, 20B1, 20B2, 20C1, and 20C2 are coupled to tracks, e.g. tracks 14X1, 14X2, 14Y1, 14Y2, 14Z1, and 14Z2, according to a position of drive electrodes 20A1, 20A2, 20B1, 20B2, 20C1, and 20C2 relative to central spine 40. As an example and not by way of limitation, drive electrode 20A1 is coupled to track 14X1 on a left side of the array through electrode connector 26A1. Also, drive electrode 20A2 is coupled to track 14X2 located on the right side of the array through electrode connector 26A2. In particular embodiments, tracks 14X1 and 14X2 coupled to a row 23a of drive electrodes 20A1 and 20A2 are coupled together with a connection (not shown) outside the touch-sensitive area of touch sensor 10.

As described in detail above, electrodes 20 are drive electrodes and electrodes 22 are sense electrodes in some embodiments. In other embodiments, electrodes 20 are sense electrodes and electrodes 22 are drive electrodes in some embodiments. The disclosure anticipates electrodes 20 and 22 being any suitable combination of drive and sense electrodes. In addition, while a certain number of electrodes 34 or "teeth" are illustrated in the figures, the disclosure anticipates any suitable number of electrodes 34.

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A touch sensor comprising:
a substrate comprising a first end and a second end opposite the first end;
a first electrode line disposed on a first side of the substrate, the first electrode line along a first direction, the first direction extending between the first end and the second end, the first electrode line comprising a plurality of first electrodes substantially perpendicular to the first direction, a set of the first electrodes decreasing in length along the first direction;
a second electrode line disposed on the first side of the substrate, the second electrode line substantially parallel to the first direction, the second electrode line comprising a plurality of second electrodes substantially perpendicular to the first direction, a set of the second electrodes increasing in length along the first direction; and
a third electrode line disposed on the first side of the substrate, the third electrode line at an angle to the first direction, the third electrode line comprising:
a plurality of third electrodes substantially perpendicular to the first direction, a set of the third electrodes decreasing in length along the first direction, the third electrodes being interdigitated with the plurality of first electrodes of the first electrode line; and
a plurality of fourth electrodes substantially perpendicular to the first direction, a set of the fourth electrodes increasing in length along the first direction, the fourth electrodes being interdigitated with the plurality of second electrodes of the second electrode line.

2. The touch sensor of claim 1, wherein:
each of the first and second electrode lines is a sense line of the touch sensor;
each of the first and second electrodes is a sense electrode of the touch sensor;
the third electrode line is a drive line of the touch sensor; and
each of the third and fourth electrodes is a drive electrode of the touch sensor.

3. The touch sensor of claim 1, wherein:
each of the first and second electrode lines is a drive line of the touch sensor;
each of the first and second electrodes is a drive electrode of the touch sensor;
the third electrode line is a sense line of the touch sensor; and
each of the third and fourth electrodes is a sense electrode of the touch sensor.

4. The touch sensor of claim 1, wherein:
the first electrode line comprises another set of the first electrodes that increase in length along the first direction;
the second electrode line comprises another set of the second electrodes that decrease in length along the first direction; and
third electrode line comprises:
another set of the third electrodes that increase in length along the first direction; and
another set of the fourth electrodes that decrease in length along the first direction.

5. The touch sensor of claim 1, wherein the angle of the third electrode line corresponds to a node pitch of the touch sensor.

6. The touch sensor of claim 1, wherein the first, second, and third electrode lines and the first, second, third, and fourth electrodes have substantially similar widths.

7. The touch sensor of claim 1, further comprising a substantially uniform gap between the first, second, and third electrode lines.

8. A device comprising:
a touch sensor comprising:
a substrate comprising a first end and a second end opposite the first end;
a first electrode line disposed on a first side of the substrate, the first electrode line along a first direction, the first direction extending between the first end and the second end, the first electrode line comprising a plurality of first electrodes substantially perpendicular to the first direction, a set of the first electrodes decreasing in length along the first direction;
a second electrode line disposed on the first side of the substrate, the second electrode line substantially parallel to the first direction, the second electrode line comprising a plurality of second electrodes substantially perpendicular to the first direction, a set of the second electrodes increasing in length along the first direction; and
a third electrode line disposed on the first side of the substrate, the third electrode line at an angle to the first direction, the third electrode line comprising:
a plurality of third electrodes substantially perpendicular to the first direction, a set of the third electrodes decreasing in length along the first direction, the third electrodes being interdigitated with the plurality of first electrodes of the first electrode line; and
a plurality of fourth electrodes substantially perpendicular to the first direction, a set of the fourth electrodes increasing in length along the first direction, the fourth electrodes being interdigitated with the plurality of second electrodes of the second electrode line; and
one or more computer-readable non-transitory storage media embodying logic that is configured when executed to control the touch sensor.

9. The device of claim 8, wherein:
each of the first and second electrode lines is a sense line of the touch sensor;
each of the first and second electrodes is a sense electrode of the touch sensor;
the third electrode line is a drive line of the touch sensor; and
each of the third and fourth electrodes is a drive electrode of the touch sensor.

10. The device of claim 8, wherein:
each of the first and second electrode lines is a drive line of the touch sensor;
each of the first and second electrodes is a drive electrode of the touch sensor;
the third electrode line is a sense line of the touch sensor; and
each of the third and fourth electrodes is a sense electrode of the touch sensor.

11. The device of claim 8, wherein:
the first electrode line comprises another set of the first electrodes that increase in length along the first direction;
the second electrode line comprises another set of the second electrodes that decrease in length along the first direction; and
third electrode line comprises:
　　another set of the third electrodes that increase in length along the first direction; and
　　another set of the fourth electrodes that decrease in length along the first direction.

12. A touch sensor comprising:
a substrate comprising a first end and a second end opposite the first end;
a first electrode line disposed on a first side of the substrate, the first electrode line along a first direction, the first direction extending between the first end and the second end, the first electrode line comprising a plurality of first electrodes substantially perpendicular to the first direction, a set of the first electrodes decreasing in length along the first direction;
a second electrode line disposed on the first side of the substrate, the second electrode line substantially parallel to the first direction, the second electrode line comprising a plurality of second electrodes substantially perpendicular to the first direction, a set of the second electrodes increasing in length along the first direction; and
a third electrode line disposed on the first side of the substrate, the third electrode line comprising a plurality of segments that stair-step at an angle to the first direction, the plurality of segments comprising a plurality of first segments and a plurality of second segments, the first segments being parallel to the first direction, the second segments being perpendicular to the first direction, the third electrode line comprising:
　　a plurality of third electrodes substantially perpendicular to the first direction, a set of the third electrodes decreasing in length along the first direction, the third electrodes being interdigitated with the plurality of first electrodes of the first electrode line; and
　　a plurality of fourth electrodes substantially perpendicular to the first direction, a set of the fourth electrodes increasing in length along the first direction, the fourth electrodes being interdigitated with the plurality of second electrodes of the second electrode line.

13. The touch sensor of claim 12, wherein:
each of the first and second electrode lines is a sense line of the touch sensor;
each of the first and second electrodes is a sense electrode of the touch sensor;
the third electrode line is a drive line of the touch sensor; and
each of the third and fourth electrodes is a drive electrode of the touch sensor.

14. The touch sensor of claim 12, wherein:
each of the first and second electrode lines is a drive line of the touch sensor;
each of the first and second electrodes is a drive electrode of the touch sensor;
the third electrode line is a sense line of the touch sensor; and
each of the third and fourth electrodes is a sense electrode of the touch sensor.

15. The touch sensor of claim 12, wherein:
the first electrode line comprises another set of the first electrodes that increase in length along the first direction;
the second electrode line comprises another set of the second electrodes that decrease in length along the first direction; and
third electrode line comprises:
　　another set of the third electrodes that increase in length along the first direction; and
　　another set of the fourth electrodes that decrease in length along the first direction.

16. A device comprising:
a touch sensor comprising:
　　a substrate comprising a first end and a second end opposite the first end;
　　a first electrode line disposed on a first side of the substrate, the first electrode line along a first direction, the first direction extending between the first end and the second end, the first electrode line comprising a plurality of first electrodes substantially perpendicular to the first direction, a set of the first electrodes decreasing in length along the first direction;
　　a second electrode line disposed on the first side of the substrate, the second electrode line substantially parallel to the first direction, the second electrode line comprising a plurality of second electrodes substantially perpendicular to the first direction, a set of the second electrodes increasing in length along the first direction; and
　　a third electrode line disposed on the first side of the substrate, the third electrode line comprising a plurality of segments that stair-step at an angle to the first direction, the plurality of segments comprising a plurality of first segments and a plurality of second segments, the first segments being parallel to the first direction, the second segments being perpendicular to the first direction, the third electrode line comprising:
　　　　a plurality of third electrodes substantially perpendicular to the first direction, a set of the third electrodes decreasing in length along the first direction, the third electrodes being interdigitated with the plurality of first electrodes of the first electrode line; and
　　　　a plurality of fourth electrodes substantially perpendicular to the first direction, a set of the fourth electrodes increasing in length along the first direction, the fourth electrodes being interdigitated with the plurality of second electrodes of the second electrode line; and
one or more computer-readable non-transitory storage media embodying logic that is configured when executed to control the touch sensor.

17. The device of claim 16, wherein:
each of the first and second electrode lines is a sense line of the touch sensor;
each of the first and second electrodes is a sense electrode of the touch sensor;
the third electrode line is a drive line of the touch sensor; and
each of the third and fourth electrodes is a drive electrode of the touch sensor.

18. The device of claim 16, wherein:
each of the first and second electrode lines is a drive line of the touch sensor;
each of the first and second electrodes is a drive electrode of the touch sensor;

the third electrode line is a sense line of the touch sensor; and each of the third and fourth electrodes is a sense electrode of the touch sensor.

19. The device of claim 16, wherein:

the first electrode line comprises another set of the first electrodes that increase in length along the first direction;

the second electrode line comprises another set of the second electrodes that decrease in length along the first direction; and third electrode line comprises:
- another set of the third electrodes that increase in length along the first direction; and
- another set of the fourth electrodes that decrease in length along the first direction.

20. The device of claim 16, wherein the angle of the stair-step corresponds to a node pitch of the touch sensor.

* * * * *